United States Patent Office 3,118,754
Patented Jan. 21, 1964

3,118,754
PROCESS FOR STIMULATING PLANT GROWTH
Louis G. Nickell, Honolulu, Hawaii, assignor to Chas.
Pfizer & Co., Inc., New York, N.Y., a corporation of
Delaware
No Drawing. Filed Oct. 10, 1961, Ser. No. 144,022
6 Claims. (Cl. 71—2.5)

This invention relates to a new and useful method of markedly increasing the growth of plants and to growth stimulating compositions for plants.

In the past, various chemical agents have been found to be useful for the stimulation of plant growth. As a consequence, economic advantage has been achieved by earlier flowering, larger fruits or legumes, speed of germination and a reverse effect on dwarfism. Conversely, other chemical agents have been known to suppress the growth, metabolism and cell division of plants. Synthesized pyrimidines as a class have been shown to exhibit such represssive-growth effects on the stem and root of plants. Duncan and Woods in Chromosoma, volume 6, pages 45–60 (1953), found that 5-aminouracil inhibits the growth of onion roots and interferes with the synthesis of desoxyribonucleic acid. Hammer in Proceedings of the American Society for Horticultural Science, volume 63, pages 495–500 (1954), has shown that 4-phthalimido-2,6-dimethylpyrimidine is a plant growth regulator. Deysson et al. in Bulletin de la societe chimie biologique, volume 40, pages 971–985 (1958), studied the antimiotic effects of eleven substituted pyrimidines, all containing at least one amino group. They found the triamino substituted pyrimidines to possess the most innibitory activity.

Sormova et al., in Experientia, volume 16, page 189 (1960), reported that 5-bromouracil and 5-nitrouracil when used in dilute concentrations in the treatment of plants produced surprising results. Unlike other uracils, these compounds stimulated the growth of plants. In the present invention, it was also unexpected to find that pyrimidine-4,6-dicarboxylic acid; dimethylpyrimidine-4,6-dicarboxylate; 4-hydroxy-2-mercapto-5,6-dimethyl pyrimidine; 4-hydroxy-2-mercapto-6-(n-propyl)pyrimidine; and 4-hydroxy-2-mercapto-6-aminopyrimidine elicited a substantial increase in growth.

Although all of the aforementioned compounds exhibited this stimulant activity, it was particularly noted that 4-hydroxy-2-mercapto-5,6-dimethylpyrimidine produced a substantial increase in the length of plant roots, e.g., in duckweed, cucumber, barley and sunflower roots.

The duckweed growth test is widely employed in the evaluation of herbicides and growth stimulants. This test is described in the Journal of Agricultural and Food Chemistry, volume 2, pages 178-182 (1954). The usual procedure employed in the duckweed test is to add the subject compound or mixtures to a synthetic nutrient solution which has been sterilized by filtration through a sintered glass funnel and to observe the growth of the duckweed (*Lemna minor*) over a period of time at various concentrations of the subject compound or mixture. The plant nutrient media usually contains the cations, potassium, magnesium, calcium and the anions, sulfate, nitrate and phosphate. A detailed description of this type of nutrient media is found in the text, Plant Science Formula, McLean and Cook (Macmillan), 1950, second edition.

The following table lists the effect of various concentrations of substituted pyrimidines, including the compounds of this invention, on the growth of *Lemna minor* when studied by the duckweed test. The results are expressed as percent change from the controls on a wet weight basis and the general structure of the pyrimidines tested is:

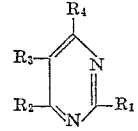

wherein $R_1$, $R_2$, $R_3$ and $R_4$ are substitutions on the pyrimidine ring as shown in Table I.

TABLE I

| Pyrimidine Substitution | | | | Percent Change from Control | | | |
|---|---|---|---|---|---|---|---|
| $R_1$ | $R_2$ | $R_3$ | $R_4$ | 1 p.p.m. | 5 p.p.m. | 10 p.p.m. | 20 p.p.m. |
| H— | HOOC— | H— | HOOC— | 100 | 370 | 390 | 350 |
| H— | $CH_3$OOC— | H— | $CH_3$OOC— | 15 | 145 | 240 | 260 |
| HS— | HO— | $CH_3$— | $CH_3$— | 220 | 245 | 250 | 245 |
| HS— | HO— | H— | $CH_3C(CH_2)_2$— | 50 | 185 | 205 | 235 |
| HS— | HO— | H— | $H_2N$— | 230 | 300 | 210 | 240 |
| HO— | H— | H— | H— | 30 | 5 | 10 | 0 |
| HS— | H— | H— | H— | 30 | 10 | −5 | −5 |
| $CH_3S$— | H— | H— | H— | −5 | −5 | 30 | 45 |
| $CH_3(CH_2)_3S$— | H— | H— | H— | 15 | 20 | 70 | 25 |
| $CH_3(CH_2)_4S$— | H— | H— | H— | 20 | 25 | 40 | −5 |
| $CH_3(CH_2)_5S$— | H— | H— | H— | 20 | 40 | 55 | 65 |
| H— | $CH_3$— | H— | $CH_3$— | −10 | −10 | −10 | −10 |
| H— | $H_2NOC$— | H— | $H_2NOC$— | 10 | 10 | 20 | 25 |
| HO— | $CH_3$— | H— | $CH_3$— | −10 | −20 | −35 | −45 |
| $CH_3S$— | $CH_3$— | H— | $CH_3$— | 5 | 25 | 60 | 40 |
| $CH_3CH_2S$— | $CH_3$— | H— | $CH_3$— | −15 | −5 | 50 | 10 |
| $CH_3(CH_2)_2S$— | $CH_3$— | H— | $CH_3$— | 0 | 10 | 25 | 25 |
| $CH_3(CH_2)_3S$— | $CH_3$— | H— | $CH_3$— | −10 | 10 | 25 | 15 |
| $CH_3(CH_2)_5S$— | $CH_3$— | H— | $CH_3$— | 0 | 0 | 0 | 50 |
| $CH_3(CH_2)_6S$— | $CH_3$— | H— | $CH_3$— | 0 | −5 | 0 | 15 |
| $CH_3(CH_2)_8S$— | $CH_3$— | H— | $CH_3$— | 20 | 50 | 35 | 45 |
| $CH_3(CH_2)_9S$— | $CH_3$— | H— | $CH_3$— | 10 | 20 | 20 | 5 |
| HO— | HO— | H— | H— | 10 | 15 | −5 | 5 |
| HO— | HO— | $N_2$— | H— | 0 | 10 | 30 | 30 |
| HO— | HO— | N— | $H_2N$— | −5 | 5 | 35 | 15 |
| HO— | $H_2N$— | $CH_3$— | H— | −35 | −35 | −65 | −65 |
| HO— | HO— | H— | $CH_3$— | 25 | 20 | 30 | 15 |
| HS— | HO— | H— | HO— | −50 | −95 | dead | dead |
| $CH_3S$— | HO— | H— | H— | −5 | −5 | 25 | 15 |
| $H_2NR$— | H— | H— | H— | 15 | 30 | 25 | 25 |
| HO— | HO— | $H_2N$— | H— | −5 | 5 | 20 | −5 |
| HO— | $H_2N$— | H— | H— | 25 | 15 | 25 | 25 |

TABLE I—Continued

| Pyrimidine Substitution | | | | Percent Change from Control | | | |
|---|---|---|---|---|---|---|---|
| $R_1$ | $R_2$ | $R_3$ | $R_4$ | 1 p.p.m. | 5 p.p.m. | 10 p.p.m. | 20 p.p.m. |
| Cl— | Cl— | H— | H— | 10 | −95 | dead | dead |
| HO— | HO— | Br— | H— | 15 | 25 | 5 | 5 |
| HO— | HO— | $CH_3$— | H— | −5 | 5 | 5 | 30 |
| HS— | HS— | H— | H— | 0 | −45 | −60 | −65 |
| H— | H— | H— | H— | 35 | 25 | 25 | 30 |
| $H_2N$— | $H_2N$— | H— | HO— | 10 | 35 | 60 | 55 |
| HO— | HO— | $O_2N$— | H— | 0 | 15 | 45 | 70 |
| $H_2N$— | $CH_3$— | H— | H— | 45 | 15 | 15 | 30 |
| $H_2N$— | HO— | H— | HO— | 10 | 25 | 45 | 80 |
| HO— | HO— | $CH_3$— | $CH_3$— | −15 | 0 | 10 | 25 |
| $H_2NCH_2$— | H— | H— | H— | −15 | −15 | 0 | 0 |
| $H_2N$— | H— | H— | $H_2N$— | −30 | −30 | 0 | 30 |

The compounds of this invention are so active as growth stimulants that it is not necessary to use them in a highly purified form; therefore, in most instances, it will be sufficient to employ them as they are obtained commercially. In general, compounds of this invention may be used at a concentration level from about 0.10 part per million to about 1000 parts per million in order to obtain this unusually high degree of growth. Although some effect may be obtained by using less than 0.10 part per million of these compounds, the growth stimulant effect may be variable and it is advisable not to use appreciably lesser amounts. The preferred amounts are levels in the range of about 1.0 part per million to about 100 parts per million, although this will vary somewhat with the plant, the compound or the combination of the heretofore mentioned compounds employed.

These compounds may be employed alone, as a plurality of the compounds of this invention or in combination with other plant growth regulatory ingredients, for example, with gibberellins. In particular, a combination of 4-hydroxy-2-mercapto-5,6-dimethylpyrimidine with gibberellic acid will induce a uniform, overall plant growth response.

Although the active agents of this invention can be used alone, it is more economical to use them in a dispersed form in a suitable agricultural carrier.

When it is said that compounds of this invention are dispersed, it means that the particles may be molecular in size and held in true solution in a suitable solvent or that the particles may be colloidal in size and dispersed through a liquid phase in the form of a suspension of an emulsion. It also includes particles which are dispersed in a semi-solid viscous carrier in which they may be actually dissolved in the carrier or held in suspension with the aid of a suitable emulsifying or wetting agent. The term dispersed also means that the particles may be mixed with and spread throughout a solid carrier so that the mixture is in the form of powder or dust. This term is also meant to encompass mixtures which are suitable for use as aerosols including solutions, suspensions or emulsions of the agents of this invention in a carrier such as Freon which boils below room temperature, at ordinary pressures.

The term agricultural carrier includes any and all of those agents in which the compounds of this invention are dispersed. It includes, therefore, the solvents of a true solution, the liquid phase of suspension, emulsions or aerosols, the semi-solid carriers and the solid phase of dust and powders.

There are many solvents which can be utilized for the preparation of solutions, suspensions or emulsions of the compounds of this invention. Any non-toxic liquid may be employed, however, the preferred solvent is water and for certain applications it may be advantageous to resort to mixtures of solvents. If the active agents are to be applied as aerosols, it is convenient to dissolve them in a suitable solvent and to disperse the resulting solution in a liquid such as Freon which boils below room temperature. For such applications it is better to employ true solutions of the active agents although it is possible to employ suspensions or emulsions of the active agents.

For use as a powder or dust the active ingredients of this invention are mixed with any number of extending agents either organic or inorganic in nature which are suitable for the manufacture of an agricultural pulverulent preparation. Such extending agents include for example, urea, potting soil, inorganic mineral salts and others. These mixtures may be used in the dry form or, by the addition of water the dry powder can be dispersed as a solution or suspension suitable for use in sprays.

In all of the forms described above, the dispersions may be provided ready for use or they may be provided in a concentrated form suitable for mixing with other extending agents before use.

In all of these various formulations the active compounds can be one or a plurality of the compounds of this invention. These compounds may also be advantageously employed in combination with other plant growth regulators and with other ingredients necessary for plant growth. There may be mentioned by way of example, gibberellins, particularly gibberellic acid, as well as auxins, urea, trace metals and minerals. In this manner, it is possible to obtain mixtures which are effective in the overall development and health of plants.

The following examples are given solely for the purpose of illustration only and are not to be construed as limitations of this invention, many variations of which are possible without departing from the spirit or scope thereof.

EXAMPLE I

Duckweed specimens were grown in standard nutrient solutions with graded levels of pyrimidine-4,6-dicarboxylic acid; dimethylpyrimidine-4,6-dicarboxylate; 4-hydroxy-2-mercapto-6-(n-propyl)pyrimidine; and 4-hydroxy-2-mercapto-6-aminopyrimidine according to the procedure described in the Journal of Agricultural and Food Chemistry, volume 2, pages 178–182 (1954).

The results obtained are recorded in Table II. In the first column is given the concentrations of the solutions used. In the second column is given the percent increase in wet weight of the *Lemna minor* contacted with solutions of various concentrations of the aforementioned compounds as compared to control experiments in which only the nutrient solution was employed.

*Table II*

Concentration (p.p.m.): Percent change from the control on wet weight basis of the plant (1) Pyrimidine-4,6-dicarboxylic acid—

1 _____ 100
    5 _____ 370
    10 _____ 390
    20 _____ 350

(2) Dimethylpyrimidine-4,6-dicarboxylate—

1 _____ 15
    5 _____ 145
    10 _____ 240
    20 _____ 260

(3) 4-hydroxy-2-mercapto-6-(n-propyl)pyrimidine—

| | |
|---|---|
| 1 | 50 |
| 5 | 185 |
| 10 | 205 |
| 20 | 235 |

(4) 4-hydroxy-2-mercapto-6-aminopyrimidine—

| | |
|---|---|
| 1 | 230 |
| 5 | 300 |
| 10 | 210 |
| 20 | 240 |

The size and number of the roots and foliage of the specimens treated with pyrimidine-4,6-dicarboxylic acid; dimethylpyrimidine-4,6-dicarboxylate; 4-hydroxy-2-mercapto-6-(n-propyl)pyrimidine; and 4-hydroxy-2-mercapto-6-amino-pyrimidine were vastly greater than the controls.

EXAMPLE II

The procedure of Example I was repeated employing 4-hydroxy-2-mercapto-5,6-dimethylpyrimidine. The results are summarized in Table III.

Table III

Concentration (p.p.m.): Percent change from the control on wet weight basis of the plant 4-hydroxy-2-mercapto-5,6-dimethylpyrimidine—

| | |
|---|---|
| 1 | 220 |
| 5 | 245 |
| 10 | 250 |
| 20 | 245 |

The roots and foliage of the specimens treated with 4-hydroxy-2-mercapto-5,6-dimethylpyrimidine were larger than the controls. In particular, the increase in root length was outstanding.

EXAMPLE III

Ten, two day old seedlings of malting barley (Hordeum vulgare) were placed on a gauze covered 150 milliliter beaker which contained 10 parts per million of 4-hydroxy-2-mercapto-5,6-dimethylpyrimidine in aqueous solution. This solution was in contact with the roots of the barley seedlings and the growth of said seedlings was measured after fourteen days at room temperature. The procedure employed was the method developed by Barton and Solt, as described in the Contributions of the Boyce Thompson Institute, volume 15, pages 259–278 (1948). The results indicated that the seedlings which had been contacted with an aqueous solution of 4-hydroxy-2-mercapto-5,6-dimethylpyrimidine exhibited longer roots and slightly greater shoot growth than the control.

EXAMPLE IV

Employing the procedure described in Example III, a beaker containing 50 parts per million of 4-hydroxy-2-mercapto-5,6-dimethylpyrimidine in aqueous solution was contacted with gauze containing ten, germinated seedlings of malting barley (Hordeum vulgare). The seedlings were allowed to grow for two weeks at room temperature and were then compared to a control. The results are summarized in Table IV.

Table IV

| Solution | Shoot Height (cm.) | Root Length (cm.) |
|---|---|---|
| Water (control) | 11.0 | 3.0 |
| 50 p.p.m. of 4-hydroxy-2-mercapto-5,6-dimethylpyrimidine | 10.0 | 6.0 |

At a concentration of 50 parts per million of 4-hydroxy-2-mercapto-5,6-dimethylpyrimidine, the plant roots were double the length of the control, with a slight decrease in shoot height.

Similar results are obtained when 4-hydroxy-2-mercapto-5,6-dimethylpyrimidine is contacted with wheat (Triticum aestivum); rye (Secale cereale) and oats (Avena sativa).

EXAMPLE V

The procedure described in Example III was repeated with cucumber (Cucumis sativus) seedlings placed in contact with an aqueous solution containing 50 parts per million of 4-hydroxy-2-mercapto-5,6-dimethylpyrimidine for nine days. The results are listed in Table V.

Table V

| Solution: | Root length (cm.) |
|---|---|
| Water (control) | 4.5 |
| 50 p.p.m. of 4-hydroxy-2-mercapto-5,6-dimethylpyrimidine | 8.0 |

It is apparent from this table that 4-hydroxy-2-mercapto-5,6-dimethylpyrimidine exerts a pronounced stimulatory effect on the root length of cucumber.

Similar results are obtained when 4-hydroxy-2-mercapto-5,6-dimethylpyrimidine is contacted with watermelon (Citrullus vulgaris), squash (Cucurbita maxima) and pumpkin (Cucurbita pepo).

EXAMPLE VI

Contacting corn (Zea mays) seedlings with a solution containing 50 parts per million of 4-hydroxy-2-mercapto-5,6-dimethylpyrimidine by the procedure described in Example III for nine days produced the results shown in Table VI.

Table VI

| Solution: | Root length (cm.) |
|---|---|
| Water (control) | 13.0 |
| 50 p.p.m. of 4-hydroxy-2-mercapto-5,6-dimethylpyrimidine | 15.0 |

This treatment produced an appreciable increase in the root length of corn.

EXAMPLE VII

The procedure described in Example III was repeated with seedlings of melting barley (Hordeum vulgare) and zinnia (Zinnia elegans) placed in contact with an aqueous solution containing 4-hydroxy-2-mercapto-5,6-dimethylpyrimidine. Table VII lists the results of these experiments after nine days growth.

Table VII

| Solution | Shoot Height (cm.) | Root Length (cm.) |
|---|---|---|
| Zinnia: | | |
| Water (control) | 3.5 | 3.5 |
| 20 p.p.m. of 4-hydroxy-2-mercapto-5,6-dimethylpyrimidine | 3.5 | 4.5 |
| Barley: | | |
| Water (control) | 12.0 | 3.0 |
| 50 p.p.m. of 4-hydroxy-2-mercapto-5,6-dimethylpyrimidine | 13.0 | 5.0 |

EXAMPLE VIII

The procedure employed in Example III was again repeated with seedlings of malting barley (Hordeum vulgare) placed in contact with a solution containing 50 p.p.m. of 4-hydroxy-2-mercapto-5,6-dimethylpyrimidine. The results after 8 days of growth are summarized in Table VIII.

Table VIII

| Solution | Shoot Height (cm.) | Root Length (cm.) |
|---|---|---|
| Water (control) | 11.0 | 3.0 |
| 50 p.p.m. of 4-hydroxy-2-mercapto-5,6-dimethylpyrimidine | 10.0 | 6.0 |

EXAMPLE IX

Ten, two day old germinated seedlings of malting barley (*Hordeum vulgare*) were contacted with an aqueous solution containing 5 parts per million of gibberellic acid and 50 parts per million or 4-hydroxy-2-mercapto-5,6-dimethylpyrimidine. After seven days of growth at room temperature, the growth of the aforementioned seedlings was compared with that of control seedlings. The results are shown in Tabel IX.

*Table IX*

| Solution | Shoot Height (cm.) | Root Length (cm.) |
|---|---|---|
| Water (control) | 9.0 | 3.0 |
| 5 p.p.m. of gibberellic acid | 12.0 | 2.0 |
| 5 p.p.m. of gibberellic acid +50 p.p.m. of 4-hydroxy-2-mercapto-5,6-dimethylpyrimidine | 13.0 | 4.0 |
| 50 p.p.m. of 4-hydroxy-2-mercapto-5,6-dimethylpyrimidine | 9.0 | 4.0 |

It is apparent from this table that combining 4-hydroxy-2-mercapto-5,6-dimethylpyrimidine with gibberellic acid enhances the overall growth of barley.

Similar results are obtained when the aforementioned mixture is contacted with wheat (*Triticum aestivum*); rye (*Secale cereale*) and oats (*Avena sativa*).

EXAMPLE X

Fifty cucumber seeds (*Cucumis sativus*) were subjected to a standard germination test on filter paper moistened with water and with a solution containing 140 parts per million of 4-hydroxy-2-mercapto-5,6-dimethylpyrimidine. The test was conducted at 28° C. for four days. At the end of this time, the total weight of the sprouted seeds was determined. Table X summarizes the results of this test. In the first column, the compound tested and a control is listed. The second column gives the number of seeds that germinated and the third column lists the total weight of the sprouted seeds in grams.

*Table X*

| Solution | Number of Germinated Seeds | Total Weight of Sprouted Seeds, grams |
|---|---|---|
| Water (control) | 47 | 3.3 |
| 140 p.p.m. of 4-hydroxy-2-mercapto-5,6-dimethylpyrimidine | 45 | 3.7 |

The seeds contacted with the aforementioned compounds were larger and heavier at the end of the test period, than those of the control. The greater weight of the treated seeds was due to a significant increase in root length of these seedlings.

EXAMPLE XI

To a mixture of 100 grams of pulverized calcium carbonate, 2 grams of olein and one gram of slaked lime, there was added sufficient 4-hydroxy-2-mercapto-5,6-methylpyrimidine to give a mixture containing 100 parts per million of 4-hydroxy-2-mercapto-5,6-methylpyrimidine and the mixture was ground in a ball mill. The resulting powder is easily scattered, has good adhesive properties and promotes growth when applied to plants.

EXAMPLE XII

The mixture of Example XI was duplicated with the addition of sufficient gibberellin to give a mixture containing 10 parts per million of gibberellin. The resulting powder when applied to plants promotes their overall growth and development.

EXAMPLE XIII

A mixture of 5 milligrams of 4-hydroxy-2-mercapto-6-(n-propyl)pyrimidine, 25 grams of talcum, 4 grams of sodium dibutyl naphthylene sulfonate, 4 grams of casein and 5 grams of sodium carbonate was ground in a ball mill. The mixture was added to an equal quantity of ground calcium carbonate and thoroughly mixed. This powder may be suspended in water immediately before use and give a growth-promoting suspension which is sufficiently stable for use in spraying applications.

EXAMPLE XIV

A mixture is prepared containing 10 milligrams of 4-hydroxy-2-mercapto-6 - amino pyrimidine, 20 grams of xylene and 80 grams of Turkey-red oil. This solution can be readily emulsified in water and the emulsion is suitable as a spray.

EXAMPLE XV

A mixture was prepared consisting of 0.005% of 4-hydroxy-2-mercapto-5,6-methylpyrimidine and 0.00025% of gibberellin in water to which was added 0.1% by volume of Tween 80 (Atlas Powder Corp.) The mixture is useful in spray applications of the active ingredients.

EXAMPLE XVI

An aqueous solution is prepared containing 0.005% of 2,4-dihydroxy-5-methyl-6-amino pyrimidine, 10% urea, 5% of phosphoric acid and 5% of potassium hydroxide. This solution is diluted with water immediately before use and gives a growth promotion solution suitable for application to plants.

EXAMPLE XVII

Pyrimidine-4,6-dicarboxylic acid was dissolved in acetone to give a 0.02% solution of the active ingredient. The solution is useful in treating seeds with the active ingredient by immersion of the seeds, followed by evaporation of the solvent.

EXAMPLE XVIII

A solution containing 15 milligrams of dimethylpyrimidine-4,6-dicarboxylate, 4 grams of acetone and 100 grams of Freon-12 is prepared in an aerosol form and used as a growth promoter.

What is claimed is:

1. A process for stimulating plant growth which comprises contacting the plant with an effective amount of a compound selected from the group consisting of pyrimidine-4,6-dicarboxylic acid; dimethylpyrimidine - 4,6-dicarboxylate; 4-hydroxy-2-mercapto - 5,6 - dimethylpyrimidine; 4-hydroxy-2 - mercapto - 6-(n-propyl)pyrimidine; and 4-hydroxy-2-mercapto-6-aminopyrimidine.

2. A process as in claim 1 wherein the growth stimulating compound is administered together with an agriculturally acceptable carrier at a concentration of from about 1 p.p.m. to about 100 p.p.m.

3. A process for stimulating plant root growth which comprises contacting the plant with an effective amount of 4-hydroxy-2-mercapto-5,6 - dimethylpyrimidine.

4. A process as in claim 3 wherein the root growth stimulating compound is administered together with an agriculturally acceptable carrier at a concentration of from about 1 p.p.m. to about 100 p.p.m.

5. A process as in claim 3 wherein the agriculturally acceptable carrier is a solid.

6. A process as in claim 3 wherein the agriculturally acceptable carrier is a liquid.

References Cited in the file of this patent

UNITED STATES PATENTS

| | | |
|---|---|---|
| 2,443,305 | Curd et al. | June 15, 1948 |
| 2,735,225 | Goodhue et al. | Feb. 21, 1956 |
| 2,842,051 | Brian et al. | July 8, 1958 |
| 2,844,578 | Acker | July 22, 1958 |
| 2,983,727 | Lyttle et al. | May 9, 1961 |

FOREIGN PATENTS

| | | |
|---|---|---|
| 198,997 | Austria | Aug. 11, 1958 |

OTHER REFERENCES

Hunt et al.: J. Chem. Soc., 1959, pages 525 to 530.